Inventor:
Josef Szydlowski
By Knight Bros
attorneys

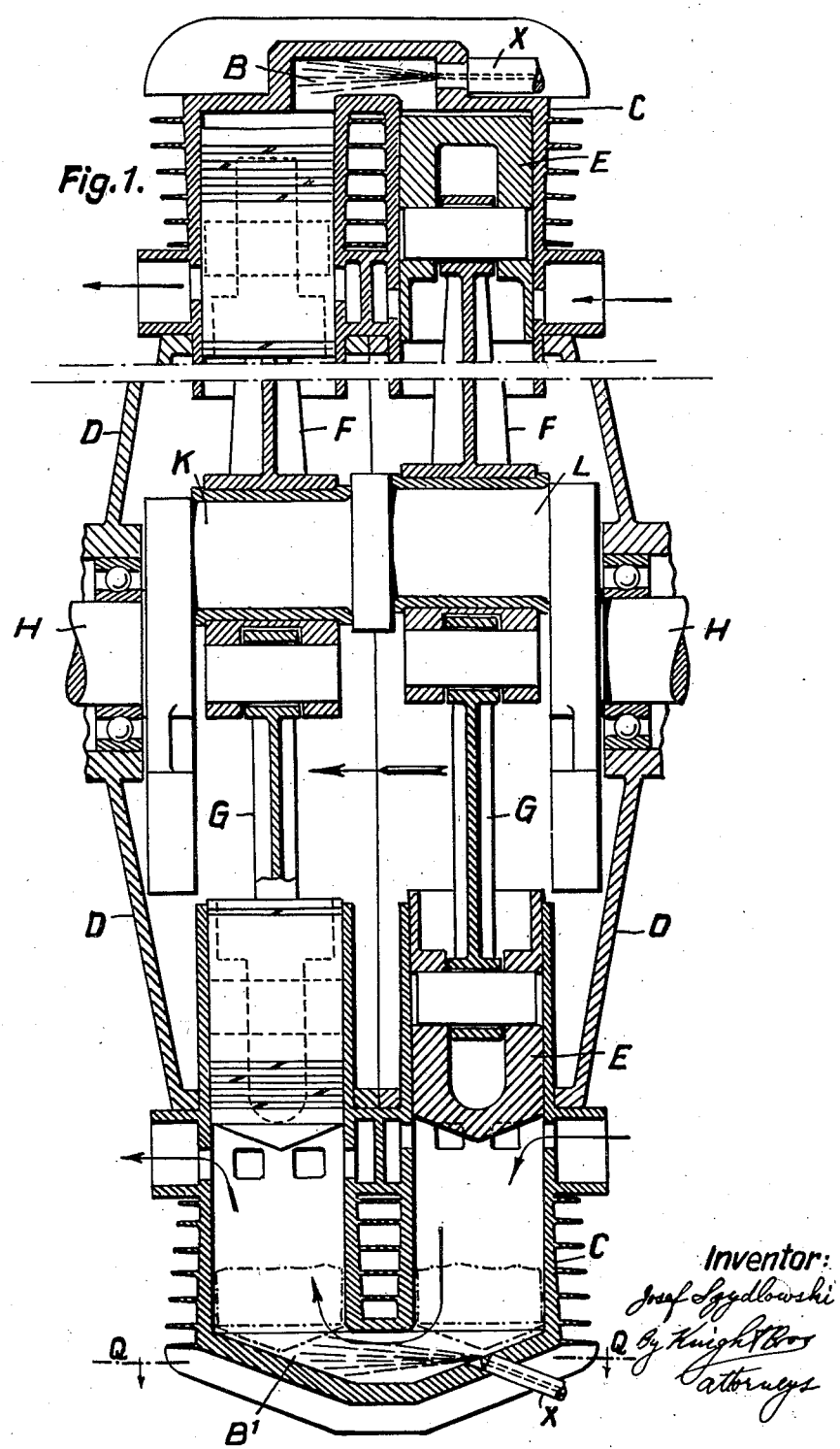

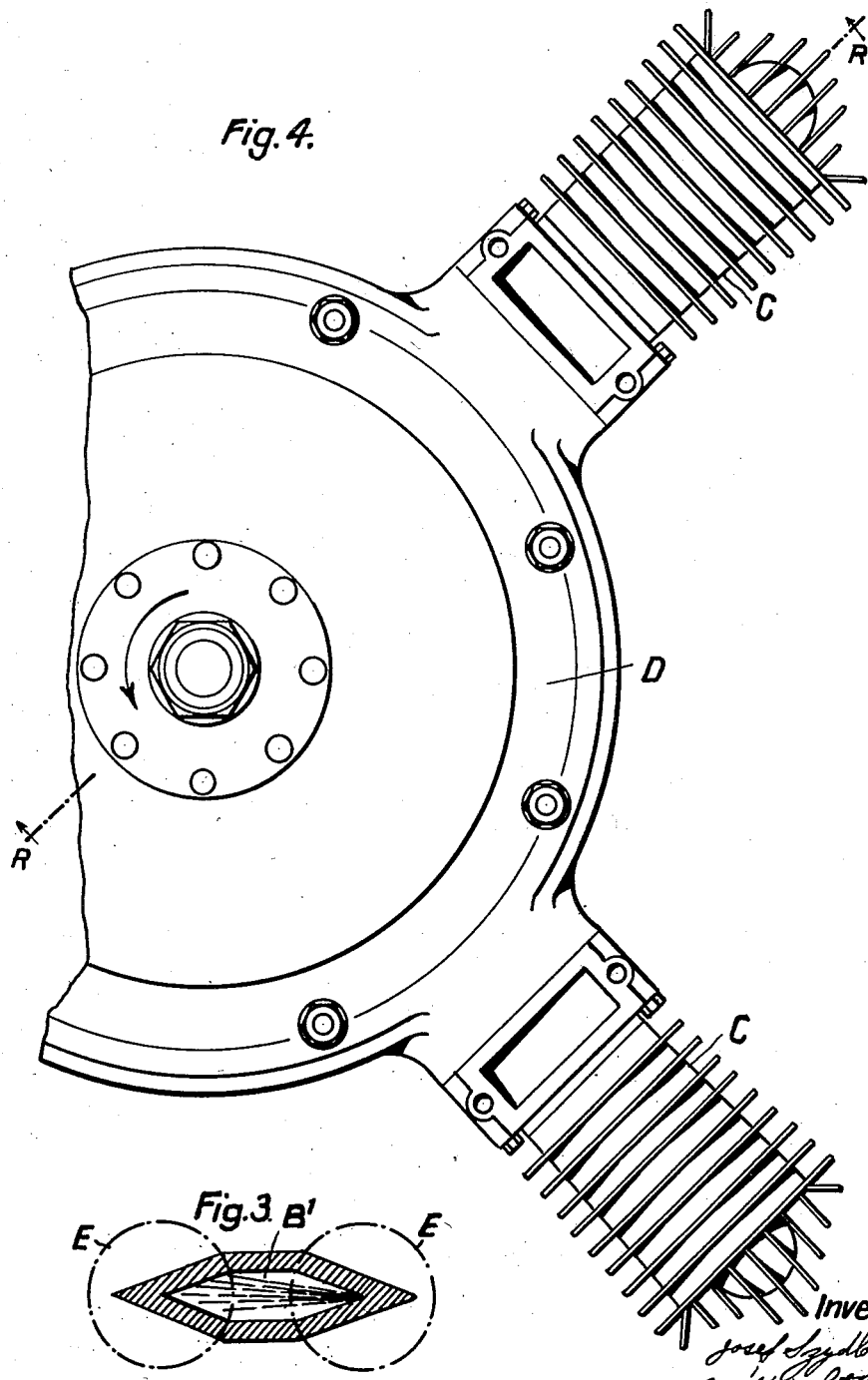

Patented June 20, 1933

1,914,793

UNITED STATES PATENT OFFICE

JOSEF SZYDLOWSKI, OF BADEN-BADEN, GERMANY

AIR COOLED TWO STROKE CYCLE ENGINE

Application filed May 13, 1930, Serial No. 452,067, and in Germany May 14, 1929.

The present invention relates to air-cooled two stroke cycle engines, whose cylinders are arranged star-shaped, for compressionless injection, adapted in particular for aeroplanes.

With motors in aeroplanes, the application of a compressionless injection is associated with great difficulties as is well known, since the motor of an aeroplane calls for the highest requirements in every respect as regards specific efficiency, weight and safety in operation. These drawbacks are obviated according to the arrangement of the present invention.

The invention substantially consists of the fact that with engines of the type referred to, two cylinders each possess a common combustion chamber, being provided with two pistons travelling in the same direction, one of which controls in known manner the exhaust and the other the admission.

Preferably the combustion chamber common to two cylinders each possesses a tube like or a tube-like conical shape, offering the advantage of adapting the combustion chamber to the shape of the fuel-cone.

According to the invention the two cylinders belonging to one pair of cylinders are arranged in succession in the direction of the crank shaft. This arrangement of the cylinders offers the advantage of a reduced resistance of air and perfect cooling conditions of both cylinders.

At the same time this arrangement renders possible the placing of the exhaust cylinder, exposed to heavier stress, in front of the admission cylinder in the direction of travel, that is to say forwardly, exposed to the current of air. In addition this arrangement will admit the use of the known driving gear of the star-shaped engines.

According to the invention, the pairs of cylinders of the motor are arranged diametrically opposite, which in two stroke cycle engines offers the advantage of relieving the crank shaft. Such relieving is effected in that each piston during the period of expansion must simultaneously accelerate the piston situated diametrically opposite, so that the pressure of combustion will act on the crank shaft only partly.

Furthermore according to the invention, both pistons belonging to one pair of cylinders are linked to two pins of the crank shaft which are displaced at a definite angle. The advance of the exhaust piston over the admission piston caused thereby will, besides the known advantages during scavenging, further cause the whole volume of air to be passed through the combustion chamber and thus intimately mixed with the fuel.

Figure 5:
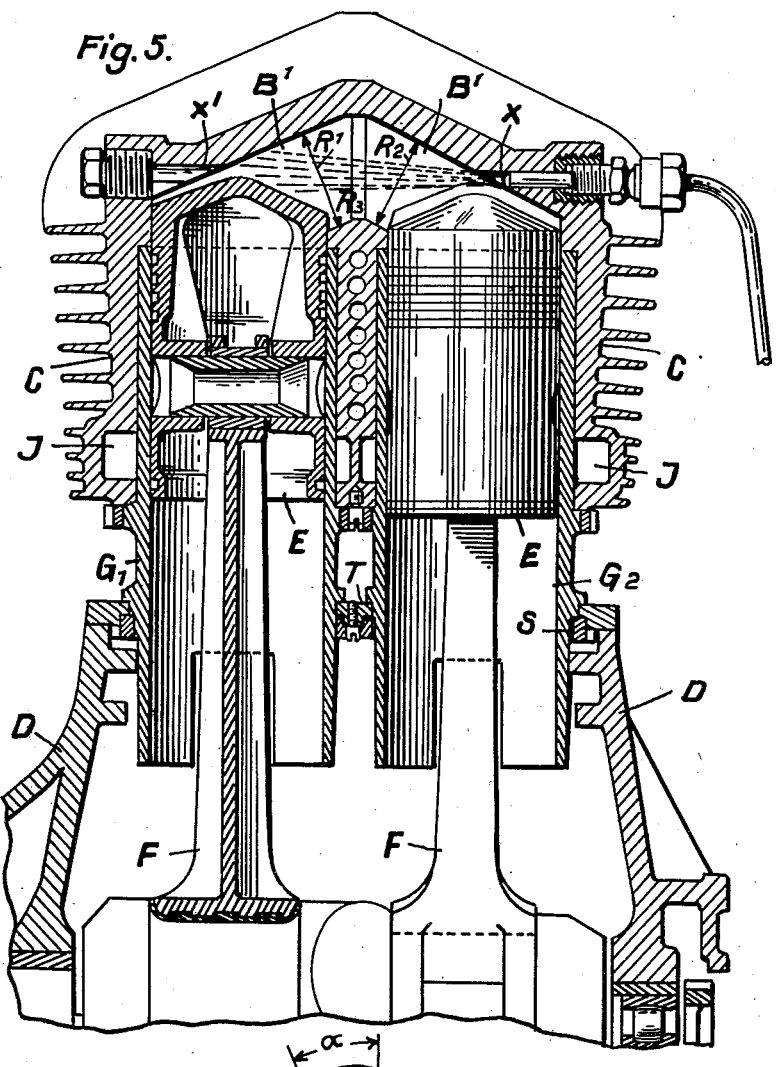
Figure 2:
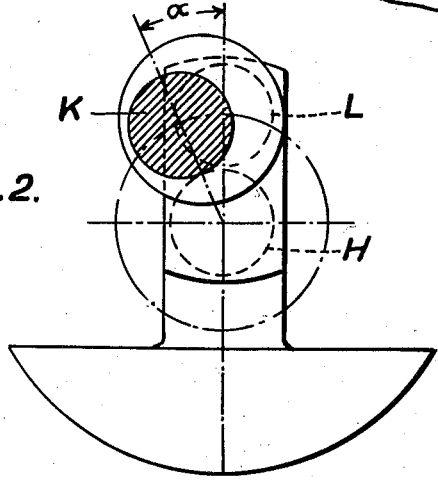

Some modes of constructions of the arrangement according to the invention are shown by way of example in the drawings in which Figure 1 is a longitudinal section of the engine, having two different constructions of the combustion chamber, Figure 2 shows diagrammatically the displacement of the crank-pins by the angle $\alpha$, Figure 3 is a section through one of the combustion chambers according to line Q—Q of Figure 1, Figure 4 is a front view of the motor with the cylinders only mounted in part, and Figure 5 shows in longitudinal section a portion of the motor of another modification.

In the cylinder block C, cast for two cylinders each, which is provided with cooling fins, travel the pistons E, which by means of the main connection rods F and the auxiliary connection rods G, linked to said main rods, act on the crank shaft H operated in the casing D. The connecting rods F and G act on the two crank pins K and L, which are displaced by the desired angle of advance $\alpha$ (Figure 2). As illustrated in Figure 4 the cylinder blocks C are arranged diametrically opposite each other.

The engine illustrated in Figure 1 is provided with two different combustion chambers B and $B^1$, reproduced by way of example. In one and the same machine it is preferable, however, to choose but one form of the combustion chamber. The combustion chamber shown in the upper half of Figure 1 and designated B possesses a tubular or cylindrical shape, while the combustion chamber $B^1$ illustrated in the lower half of Figure 1 has a tubular conical truncated shape and in the cross section according to Figure 3 it is tapered in the shape of a double cone.

This construction of the combustion chambers, which partly overlap the ends of the cylinders of each pair of cylinders offers the advantage, that the form of the combustion chambers is adapted to the shape of the fuel-cone. In this instance, the axis of the injection-nozzle lies symmetrically to the conical combustion chamber.

The arrangement of a combustion chamber common to two cylinders renders possible the provision of only one injection nozzle X for the fuel, which opens into the combustion chamber at the end of the channel, injecting the fuel in longitudinal direction of the combustion chamber transversely to the cylinders. The injection nozzle is arranged on the admission side of the cylinders and the direction of injection of the said nozzle coincides, in consequence of the displacement of the crank pins, with the direction of flow of the air during the combustion.

According to the invention the combustion chamber is arranged openly, so that the air may extensively come into contact with its external walls and effect a perfect cooling.

In the modifications shown in the lower portion of Figure 1 and in Figure 5 the bottom faces of the pistons possess a conical shape.

In the construction according to Figure 5 the cylinder head C is designed as a cylinder jacket into which the cylinder liners $G^1$ and $G^2$ are screwed or shrunk in.

The mantle or jacket C extends beyond the controlling slots J. Below the light-metal jacket C of the cylinder there is slipped over over the liners $G^1$ and $G^2$ of the cylinder a common flange T, connected with said liners either by means of screws S or directly by welding.

The injection or combustion chamber $B^1$ respectively consists of the tubular channels $R^1$ and $R^2$ which extend in alignment with the cylinder cones. Both the channels $R^1$ and $R^2$ may merge one into the other directly or by means of a straight center piece $R^3$ or even by means of a rounding. The outer edges of the tubular conically truncated combustion chamber are situated thereby in alignment or approximately in alignment with the cylinder cones.

In lieu of a fuel injecting nozzle X there may also be arranged a plurality of such nozzles as indicated at $X^1$.

The construction of the engine according to the invention may of course be varied as regards details shown in the modifications illustrated without departing in any way from the scope of the invention.

I claim:

1. An air cooled two-stroke cycle engine for compressionless injection of the combustible material, comprising a pair of closely adjacent cylinders exposed to the air, a combustion chamber common to said pair of cylinders, pistons in said cylinders, a crank shaft, connecting rods between said pistons and said crank shaft, said pistons running substantially in the same direction, admission ports for air controlled by one of said pistons and exhaust ports for the burned gases controlled by the other piston, said combustion chamber consisting of a channel extending substantially at right angles to the axes of the cylinders from the ends thereof and overlapping only part of the end surfaces thereof, the ends of said channel being pointed in a conical form, and a fuel nozzle disposed in one of said ends adapted to direct a fuel spray in the longitudinal direction of said combustion chamber.

2. An air cooled two-stroke cycle engine for compressionless injection of the combustible material comprising a pair of closely adjacent cylinders exposed to the air, a combustion chamber common to said pair of cylinders, pistons in said cylinders, a crank shaft having two cranks at a slight angle with respect to each other, connecting rods between said pistons and said cranks, whereby one piston is caused to lag slightly behind the other, admission ports for air controlled by the lagging piston, and exhaust ports for the burned gases controlled by the leading piston, said combustion chamber consisting of a channel extending substantially at right angles to the axes of the cylinders from the ends thereof and overlapping only part of the end surfaces thereof, and a fuel nozzle disposed in the end of said combustion chamber leading from the cylinder containing said admission ports and adapted to direct a fuel spray in the longitudinal direction of said combustion chamber.

3. An air cooled two-stroke cycle engine for compressionless injection of the combustible material comprising a pair of closely adjacent cylinders exposed to the air, a combustion chamber common to said pair of cylinders, pistons having conically shaped ends in said cylinders, a crank shaft, connecting rods between said pistons and said crank shaft, said pistons running substantially in the same direction, admission ports for air controlled by one of said pistons and exhaust ports for the burned gases controlled by the other piston, said combustion chamber consisting of a channel in the cylinder ends extending substantially at right angles to the axes of the cylinders from the ends thereof and overlapping only part of the end surfaces thereof, the ends of said channel being pointed in conical form and said cylinder ends being pointed in conical form in conformance with the conically shaped pistons.

4. An air cooled two-stroke cycle engine for compressionless injection of the combustible material comprising a pair of closely adjacent cylinders exposed to the air, a combustion chamber common to said pair of cylinders, pistons having conically shaped ends in said cylinders, a crank shaft, connecting rods between said pistons and said crank shaft, said pistons running substantially in the same direction, admission ports for air controlled by one of said pistons and exhaust ports for the burned gases controlled by the other piston, said combustion chamber consisting of a channel in the cylinder ends extending substantially at right angles to the axes of the cylinders from the ends thereof and overlapping only part of the end surfaces thereof, the ends of said channel being pointed in conical form and said cylinder ends being pointed in conical form in conformance with the conically shaped pistons, the ends of said channel lying substantially at the apices of the cone-shaped cylinder ends.

5. An air cooled two-stroke cycle engine for compressionless injection of the combustible material comprising a pair of closely adjacent cylinders exposed to the air, a combustion chamber common to said pair of cylinders, pistons having conically shaped ends in said cylinders, a crank shaft, connecting rods between said pistons and said crank shaft, said pistons running substantially in the same direction, admission ports for air controlled by one of said pistons and exhaust ports for the burned gases controlled by the other piston, said combustion chamber consisting of a channel in the cylinder ends extending substantially at right angles to the axes of the cylinders from the ends thereof and overlapping only part of the end surfaces thereof, the ends of said channel being pointed in conical form and said cylinder ends being pointed in conical form in conformance with the conically shaped pistons, the cone angle of the ends of said combustion chamber being supplementary to the cone angle of the ends of said pistons.

In testimony whereof I affix my signature to this specification.

JOSEF SZYDLOWSKI.